Patented Oct. 28, 1952

2,615,865

UNITED STATES PATENT OFFICE 2,615,865

COPOLYMERS OF VINYLIDENE CYANIDE WITH MONOOLEFINS

Alan E. Ardis, Cuyahoga Falls, Ohio, assignor to
The B. F. Goodrich Company, New York, N. Y.,
a corporation of New York No Drawing. Application September 13, 1949,
Serial No. 115,561

9 Claims. (Cl. 260—78.5)

This invention relates to the preparation of novel copolymers of vinylidene cyanide with certain monoolefins, which copolymers are extremely useful in the preparation of filaments and films.

In U. S. Patent 2,476,270 to Alan E. Ardis, and in copending applications, Serial No. 63,434 filed December 3, 1948, now U. S. Patent 2,502,412 and Serial No. 79,712 filed March 4, 1949, now U. S. Patent 2,514,387, novel methods for the preparation of monomeric vinylidene cyanide are disclosed. In another copending application Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C. depending on purity with purest samples melting at 9.0° C. to 9.7° C. and it boils at 40° C. at a reduced pressure of 5 mm. of mercury. It is quite unstable because of its extreme sensitivity to water, undergoing on contact with water at room temperature an instantaneous homopolymerization reaction to give a solid water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with certain monoolefins in the presence of a free radical catalyst to give new and useful copolymers. These copolymers are essentially 1:1 alternating copolymers, that is, copolymers possessing the structure:

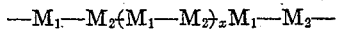

wherein each $M_1$ is a vinylidene cyanide unit

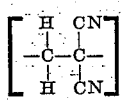

and each $M_2$ is a unit of the monoolefin

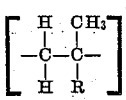

and $x$ is any number, preferably from 150 to 20,000. The fact that the copolymers thus obtained are essentially 1:1 alternating copolymers is determined by analysis of the copolymer and by the following copolymerization equation of F. M. Lewis, C. Walling et al., Journal of the American Chemical Society, 70, 1519 (1948):

$$\frac{d(M_1)}{d(M_2)} = \frac{(M_1)}{(M_2)} \cdot \frac{r_1(M_1)+(M_2)}{r_2(M_2)+(M_1)}$$

wherein $(M_1)$ = Concentration of unreacted monomer $M_1$
$(M_2)$ = Concentration of unreacted monomer $M_2$
$r_1$ = ratio of the rate constants for the reaction of an $M_1$ type radical with $M_1$ and $M_2$ respectively
$r_2$ = ratio of the rate constants for the reaction of an $M_2$ type radical with $M_2$ and $M_1$ respectively.

When the product of $r_1$ and $r_2$ (the values of $r_1$ and $r_2$ being determined by solving the equation for $r_1$ and $r_2$) is equivalent to zero, a 1:1 alternating copolymer is formed, that is, a copolymer having the

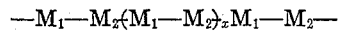

structure shown hereinabove for the copolymers of vinylidene cyanide with monoolefins. That these copolymers possess the 1:1 alternating structure is demonstrated by the fact that when $M_1$ is vinylidene cyanide and $M_2$=isobutylene, $r_1$=0.182 and $r_2$=0.00176; therefore the product of $r_1$ and $r_2$ is 0.0003, which is, of course, substantially equivalent to zero.

It is highly surprising that vinylidene cyanide will polymerize with monoolefins to give the essentially 1:1 alternating copolymer since almost without exception monomer pairs exhibit a very strong tendency to polymerize randomly rather than to form the alternating type copolymer of this invention, this being especially true of vinylidene and vinyl compounds. In fact, it has heretofore been believed that in order to get an alternating copolymer it is necessary that the system contain at least one monomer that does not polymerize by itself to give a high molecular weight polymer.

Thus it is all the more surprising that vinylidene cyanide and monoolefins, both of which polymerize readily by themselves, would form the 1:1 alternating type copolymer.

Any olefin of the general structure

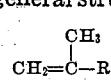

wherein R is an alkyl radical, preferably containing from 1 to 6 carbon atoms, may be polymerized with vinylidene cyanide to give the alternating copolymers in accordance with this invention. Such olefins include isobutylene (2-methyl propene - 1), 2 - methylbutene-1,2-methylpentene-1, 2,3-dimethylbutene - 1, 2,3 - dimethylpentene - 1, 2,4-dimethylpentene-1, 2,3,3-trimethylbutene-1, 2-methylheptene-1, 2,3-dimethylhexene-1, 2,4-dimethylhexene-1, 2,5-dimethylhexene-1, 2-methyl-3-ethylpentene-1, 2,3,3-trimethylpentene-1, 2,3,4-trimethylpentene-1, 2,4,4-trimethylpentene-1, 2-methyloctene-1, 2,6-dimethylheptene-1, 2,6-dimethyloctene-1, 2,3-dimethyldecene-1, 2-methylnonadecene-1 and the like. Because of its low cost and availability, isobutylene is preferably utilized although other of the compounds listed above are also used successfully.

The polymerization itself may be carried out in several different ways. One preferred method consists in first dissolving the vinylidene cyanide and the monoolefin in benzene or other aromatic solvent such as toluene, methyl toluene, trichloro benzene, or the like, preferably free from impurities which initiate the ionic polymerization of the monomer, and in an amount such that the solvent comprises approximately 30 to 80% by weight of the total solution. A polymerization catalyst is included in this solution and the resulting mixture is heated to a temperature of about 30° C. to 80° C., whereupon polymerization occurs to form the desired copolymer as a white powder of small particle size. The copolymer thus formed may be separated from the polymerization medium simply by filtering or if desired the polymerization medium may be removed by an evaporation process.

A second method of polymerization consists in agitating the monomers in a liquid aliphatic hydrocarbon (which are non-solvents for vinylidene cyanide) for example, hexene or heptane, in the presence of a polymerization catalyst, whereupon the copolymer forms and may be separated from the polymerization medium by filtering or by evaporating the medium. It is important when utilizing this method of polymerization that the liquid aliphatic hydrocarbon be free from impurities which initiate the ionic polymerization of vinylidene cyanide.

Alternatively, the polymerization may be carried out without the use of a solvent or other liquid medium for the monomers, that is, simply by heating and agitating a mixture of the monomers and the polymerization catalyst to effect the polymerization. Also, the polymerization may be effected at temperatures as low as 0° C. or lower or as high as 100° C. or even higher provided a catalyst is utilized which will dissociate into free radicals at the polymerization temperature.

It is to be understood, of course, that regardless of the polymerization method utilized the polymerization should be stopped before either of the monomers is entirely consumed, in order that an essentially 1:1 alternating copolymer will be obtained. Otherwise, when either of the monomers is completely used up, the product will contain straight polymers obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst which is used in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide and the like. In general from .01 to .1% by weight of the catalyst is utilized, although smaller or larger amounts may be utilized if desired. By regulating the amount of the catalyst it is possible to control very accurately the molecular weight of the copolymer. For instance, to obtain a high-molecular weight copolymer, a small quantity of catalyst is used, while low-molecular weight copolymers are obtained by the use of large amounts of catalyst.

It is quite unusual that peroxygen catalysts such as those listed above can be successfully utilized in the present invention since ordinarily isobutylene-type monomers polymerize only in the presence of a Friedel-Crafts catalyst.

The following examples illustrate the preparation of copolymers of vinylidene cyanide and olefins of the formula

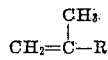

in accordance with this invention, but are not to be construed as a limitation upon the scope thereof, for there are, of course, numerous possible variations and modifications. In the examples all parts are by weight.

EXAMPLES I TO III

A series of three vinylidene cyanide-isobutylene copolymers are prepared by adding the monomers to benzene, adding o,o'-dichlorobenzoyl peroxide as the polymerization catalyst and heating the resulting solution to a temperature of about 45° C., whereupon polymerization occurs to form the essentially 1:1 alternating copolymer as uniform small white particles. After approximately 20 hours, the copolymer is separated from the polymerization medium by filtering. The charging rates of the monomers and catalyst, the percent nitrogen in the copolymer, the mole percentage of vinylidene cyanide in the copolymer and the conversions obtained are recorded in the following table:

*Table*

| Example No. | I | II | III |
| --- | --- | --- | --- |
| Parts benzene | 14.5 | 14.5 | 14.5 |
| Weight percent benzene | 71.5 | 69.5 | 78.5 |
| Parts vinylidene cyanide charged | 0.7 | 2.0 | 1.98 |
| Mole percent vinylidene cyanide | 8.9 | 24.6 | 41.9 |
| Parts isobutylene charged | 5.18 | 4.38 | 1.97 |
| Mole percent isobutylene | 91.1 | 75.4 | 58.1 |
| Parts catalyst charged | 0.008 | 0.006 | 0.004 |
| Weight percent catalyst | 0.13 | 0.094 | 0.10 |
| Mole percent vinylidene cyanide in polymer | 50.0 | 51.0 | 53.4 |
| Conversion (Based on total weight of monomers charged) | 18.9 | 43.0 | 50.9 |

When other monoolefins of the formula

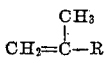

are substituted for isobutylene in the above examples, the copolymers obtained are also essentially 1:1 alternating copolymers having properties generally equivalent to the vinylidene cyanide-isobutylene copolymers. Likewise, when the polymerization is carried out utilizing other mole percentages of vinylidene cyanide including 1 and 95 mole percent, or when the polymerization is carried out according to the other methods described hereinabove, or using other of the peroxygen catalysts disclosed, excellent results are achieved.

The copolymers which are prepared according to this invention are characterized by being soluble in nitromethane, cyclopentanone, carbon tetrachloride, chloroform, tetrahydrofurane, nitrobenzene, tetrahydro thiophene-1,-dioxide and dimethyl formamide. They are insoluble in benzene, chlorobenzenes, alcohols and ethers.

As disclosed hereinabove, the copolymers of this invention are extremely valuable in the preparation of solutions from which can be spun filaments of any desired size possessing unusually high tensile strengths, excellent resistance to the action of alkalis and acids, as well as many other advantageous properties. To illustrate the superior quality of filaments obtained from vinylidene cyanide-isobutylene copolymers, the 50 mole percent copolymer of Example I is spun into filaments from a dimethyl formamide solution, using water as the spinning bath and "hot-stretched" by a method whereby the filament is stretched in a series of steps, a process disclosed in a copending application, Serial No. 113,018, filed August 29, 1949. The filament thus prepared has a high tensile strength, low elongation at break and is neither acid nor alkaline sensitive. When heated to a temperature in excess of about 80° C. the filaments become quite elastic. By this procedure highly oriented filaments are obtained which give a sharp, crystalline, X-ray diffraction pattern. In addition to the use of dimethyl formamide as the solvent for the copolymer, other of the solvents listed in the foregoing paragraph may also be used advantageously.

Although specific examples of the invention have been herein described, it is not intended to limit the invention solely thereto, but to include all of the variations and modifications falling within the spirit and scope of the appended claims.

I claim:

1. A copolymer of monomeric vinylidene cyanide and a monoolefin of the structure

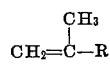

wherein R is an alkyl radical, said copolymer possessing essentially the structure $$—M_1—M_2(M_1—M_2)_x M_1—M_2—$$

wherein each $M_1$ represents the vinylidene cyanide unit of the structure

each $M_2$ represents a monoolefin unit of the structure

and $x$ represents a number, said copolymer being a resinous, heat-softenable solid which is soluble at room temperature in dimethyl formamide but which is insoluble at room temperature in each of alcohol, benzene, and ether, the monomeric vinylidene cyanide entering into said copolymer to produce the vinylidene cyanide units being a liquid at room temperature and a crystalline solid at 0° C., having a melting point when in purest form of substantially 9.0° C. to 9.7° C. and being characterizable chemically by the ability to undergo on contact with water at room temperature an instantaneous homopolymerization reaction to give a solid water-insoluble resin and by the ability to react at room temperature with butadiene-1,3 to give solid 4,4-dicyanocyclohexene.

2. The copolymer of claim 1 wherein the radical R is an alkyl radical containing from 1 to 6 carbon atoms.

3. The copolymer of claim 1 wherein the monoolefin of the structure

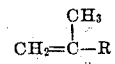

is isobutylene.

4. The method which comprises preparing a liquid medium containing liquid monomeric vinylidene cyanide, said liquid monomeric vinylidene cyanide being characterizable chemically by the ability to undergo on contact with water at room temperature an instantaneous homopolymerization reaction to give a solid water-insoluble resin and by the ability to react with butadiene at room temperature to give solid 4,4-dicyanocyclohexene, admixing said liquid medium with a monoolefin of the structure

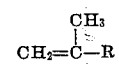

wherein R is an alkyl radical, in an amount such that the mixture contains from 1 to 95 mole per cent of monomeric vinylidene cyanide, and with a peroxygen catalyst, and maintaining the resulting mixture at a temperature of 0° C. to 100° C., thereby to form a solid, resinous copolymer of vinylidene cyanide with said monoolefin, said copolymer possessing essentially the structure $$—M_1—M_2(M_1—M_2)_x M_1—M_2—$$

wherein each $M_1$ represents the vinylidene cyanide unit of the structure

each $M_2$ represents the monoolefin unit of the structure

and $x$ represents a number.

5. The method of claim 4 wherein R is an alkyl radical containing from 1 to 6 carbon atoms.

6. The method of claim 4 wherein the liquid medium containing monomeric vinylidene cyanide consists of monomeric vinylidene cyanide dissolved in an organic solvent which is inert thereto.

7. The method of claim 6 wherein the organic solvent is a liquid hydrocarbon.

8. The method of claim 6 wherein the monoolefin is isobutylene, the liquid hydrocarbon solvent is benzene, and the peroxygen catalyst is o,o'-dichlorobenzoyl peroxide.

9. A synthetic resinous filament comprising a copolymer of vinylidene cyanide and isobutylene, said copolymer possessing essentially the structure $$—M_1—M_2(M_1—M_2)_x M_1—M_2—$$

wherein each $M_1$ is a vinylidene cyanide unit of the structure

each $M_2$ is an isobutylene unit of the structure

and $x$ is a number the vinylidene cyanide units being derived from the monomeric vinylidene cyanide which is a liquid at room temperature and a crystalline solid at 0° C. having a melting point when in purest form of substantially 9.0 to 9.7° C. and being characterizable chemically by the ability to undergo on contact with water at room temperature an instantaneous homopolymerization reaction to give a solid water-insoluble resin, said copolymer being a resinous, heat-softenable solid which is soluble at room temperature in dimethyl formamide, but which is insoluble at room temperature in each of alcohol, benzene and ether.

ALAN E. ARDIS.

REFERENCES CITED

The following references are of record in the file of this patent:

UNITED STATES PATENTS

| Number | Name | Date |
|---|---|---|
| 2,396,785 | Hanford | Mar. 19, 1946 |
| 2,466,395 | Dickey | Apr. 5, 1949 |